(12) United States Patent
Propheter-Hinckley et al.

(10) Patent No.: US 11,028,702 B2
(45) Date of Patent: Jun. 8, 2021

(54) AIRFOIL WITH COOLING PASSAGE NETWORK HAVING FLOW GUIDES

(71) Applicant: United Technologies Corporation, Farmington, CT (US)

(72) Inventors: Tracy A. Propheter-Hinckley, Rocky Hill, CT (US); Allan N. Arisi, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 228 days.

(21) Appl. No.: 16/218,691

(22) Filed: Dec. 13, 2018

(65) Prior Publication Data

US 2020/0190999 A1 Jun. 18, 2020

(51) Int. Cl.
*F01D 5/18* (2006.01)
*F01D 5/14* (2006.01)

(52) U.S. Cl.
CPC ............. *F01D 5/189* (2013.01); *F01D 5/147* (2013.01); *F05D 2240/126* (2013.01); *F05D 2260/201* (2013.01); *F05D 2260/22141* (2013.01)

(58) Field of Classification Search
CPC .... F01D 5/189; F01D 5/147; F05D 2240/126; F05D 2260/201; F05D 2260/22141
See application file for complete search history.

(56) References Cited

U.S. PATENT DOCUMENTS

| | | | |
|---|---|---|---|
| 4,474,532 A | 10/1984 | Pazder | |
| 5,772,397 A | 6/1998 | Morris et al. | |
| 6,056,505 A | 5/2000 | Cunha | |
| 7,097,425 B2 * | 8/2006 | Cunha | F01D 5/187 416/97 R |
| 7,121,787 B2 * | 10/2006 | Jacks | F01D 5/186 415/115 |
| 9,091,495 B2 * | 7/2015 | Lee | F01D 5/187 |
| 9,115,590 B2 | 8/2015 | Spangler et al. | |
| 9,920,635 B2 * | 3/2018 | Bommisetty | F01D 5/187 |
| 10,323,524 B2 | 6/2019 | Lewis | |
| 10,485,253 B2 | 11/2019 | Benmoussa | |

(Continued)

FOREIGN PATENT DOCUMENTS

| | | |
|---|---|---|
| EP | 0896127 | 2/1999 |
| EP | 1091092 | 4/2001 |

(Continued)

OTHER PUBLICATIONS

European Search Report for European Patent Application No. 19215753.5 completed Jan. 29, 2020.

*Primary Examiner* — Aaron R Eastman

(74) *Attorney, Agent, or Firm* — Carlson, Gaskey & Olds, P.C.

(57) ABSTRACT

An airfoil includes a cooling passage network is embedded in an airfoil wall between inner and outer portions of the airfoil wall. The cooling passage network has an entrance region adjacent the first end of the airfoil section, a plenum region between the entrance region and the second end of the airfoil section, and an exit region adjacent the plenum region. The entrance region includes a plurality of flow guides that divide the entrance region into a plurality of channels that open into the plenum region. The plenum region includes a plurality of pedestals that have a shape that is different from the flow guides.

20 Claims, 3 Drawing Sheets

(56) References Cited

U.S. PATENT DOCUMENTS

| | | | |
|---|---|---|---|
| 10,724,381 B2 | 7/2020 | Loricco | |
| 2002/0021966 A1* | 2/2002 | Kvasnak | F01D 5/187 |
| | | | 416/97 R |
| 2005/0031451 A1* | 2/2005 | Cunha | F01D 5/187 |
| | | | 416/97 R |
| 2006/0093480 A1* | 5/2006 | Cunha | F01D 5/187 |
| | | | 416/97 R |
| 2006/0239819 A1* | 10/2006 | Albert | F01D 5/187 |
| | | | 416/97 R |
| 2014/0093389 A1* | 4/2014 | Morris | F01D 5/183 |
| | | | 416/97 R |
| 2016/0237849 A1* | 8/2016 | King | F01D 9/04 |
| 2016/0326885 A1 | 11/2016 | Lewis | |
| 2016/0376896 A1* | 12/2016 | Spangler | F01D 25/12 |
| | | | 415/115 |
| 2018/0156044 A1 | 6/2018 | Clark et al. | |

FOREIGN PATENT DOCUMENTS

| | | | |
|---|---|---|---|
| EP | 1505256 | 2/2005 | |
| EP | 1808574 A2 * | 7/2007 | ............ F01D 5/186 |
| EP | 2489838 | 8/2012 | |
| EP | 2586981 | 5/2013 | |
| EP | 3196410 | 7/2017 | |

* cited by examiner

AIRFOIL WITH COOLING PASSAGE NETWORK HAVING FLOW GUIDES

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section that has an airfoil wall defining a leading end, a trailing end, and first and second sides joining the leading end and the trailing end. The first and second sides span in a longitudinal direction between first and second ends. The airfoil wall circumscribes an internal core cavity. A cooling passage network is embedded in the airfoil wall between inner and outer portions of the airfoil wall. The cooling passage network has an entrance region adjacent the first end of the airfoil section, a plenum region between the entrance region and the second end of the airfoil section, and an exit region adjacent the plenum region. The entrance region has a plurality of flow guides dividing the entrance region into a plurality of channels opening into the plenum region, and the plenum region includes a plurality of pedestals having a shape different from the flow guides.

In a further embodiment of any of the foregoing embodiments, each of the flow guides has a distinct shape among the plurality of flow guides, and the flow guides define flow guide lengths in the longitudinal direction, and the flow guide lengths differ from each other.

In a further embodiment of any of the foregoing embodiments, the flow guides define flow guide thicknesses in a direction perpendicular to the longitudinal direction, and the flow guide thicknesses differ from each other.

In a further embodiment of any of the foregoing embodiments, at least one of the flow guides is arced.

In a further embodiment of any of the foregoing embodiments, at least one of the flow guides is straight.

In a further embodiment of any of the foregoing embodiments, the plurality of flow guides consists of three flow guides dividing the entrance region into four of the channels.

In a further embodiment of any of the foregoing embodiments, at least two of the flow guides overlap in a direction perpendicular to the longitudinal direction.

In a further embodiment of any of the foregoing embodiments, the pedestals define pedestal lengths in the longitudinal direction. The flow guides define flow guide lengths in the longitudinal direction, and the pedestal lengths are less than at least one of the flow guide lengths.

In a further embodiment of any of the foregoing embodiments, the exit region includes a rib that is elongated in the longitudinal direction.

In a further embodiment of any of the foregoing embodiments, the rib defines a rib length in the longitudinal direction, and the rib length is greater than each of the pedestal lengths.

A further embodiment of any of the foregoing embodiments includes first and second platforms attached, respectively, with the first and second ends. The second platform has a plenum, and cooling passage network including an outlet orifice opening to the plenum.

A gas turbine engine according to an example of the present disclosure includes a compressor section, a combustor in fluid communication with the compressor section, and a turbine section in fluid communication with the combustor. The turbine section has a turbine airfoil according to any of the previous examples.

In a further embodiment of any of the foregoing embodiments, each of the flow guides has a distinct shape among the plurality of flow guides. The flow guides define flow guide lengths in the longitudinal direction, and the flow guide lengths differ from each other.

In a further embodiment of any of the foregoing embodiments, the flow guides define flow guide thicknesses in a direction perpendicular to the longitudinal direction, and the flow guide thicknesses differ from each other.

In a further embodiment of any of the foregoing embodiments, at least one of the flow guides is arced.

In a further embodiment of any of the foregoing embodiments, at least one of the flow guides is straight.

In a further embodiment of any of the foregoing embodiments, the plurality of flow guides consists of three flow guides dividing the entrance region into four of the channels.

In a further embodiment of any of the foregoing embodiments, at least two of the flow guide overlap in a direction perpendicular to the longitudinal direction.

In a further embodiment of any of the foregoing embodiments, the pedestals defines pedestal lengths in the longitudinal direction. The glow guides define flow guide lengths in the longitudinal direction, and the pedestal lengths are less than at least one of the flow guide lengths.

In a further embodiment of any of the foregoing embodiments, the exit region includes a rib that is elongated in the longitudinal direction, the rib defines a rib length in the longitudinal direction, and the rib length is greater than each of the pedestal lengths.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
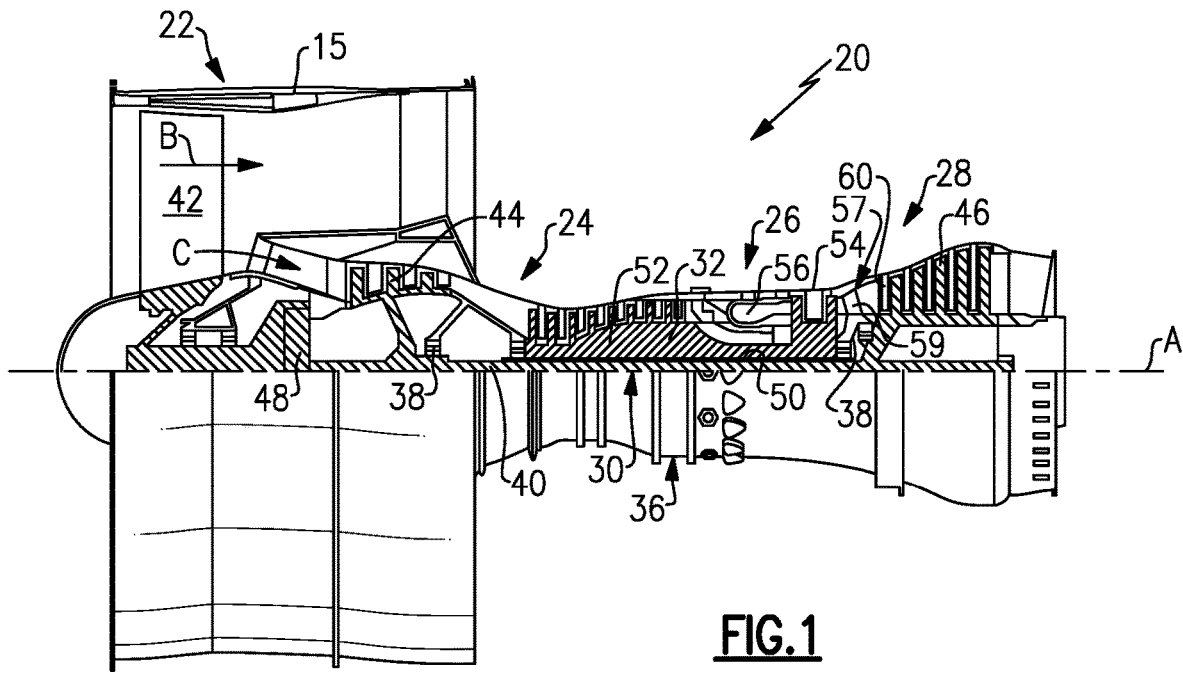
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
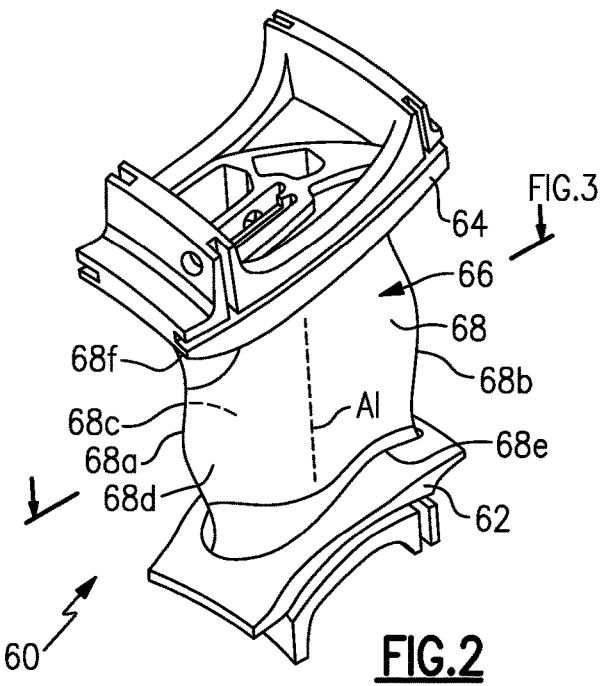
FIG. 2 illustrates an airfoil of the gas turbine engine of FIG. 1.
Figure 3:
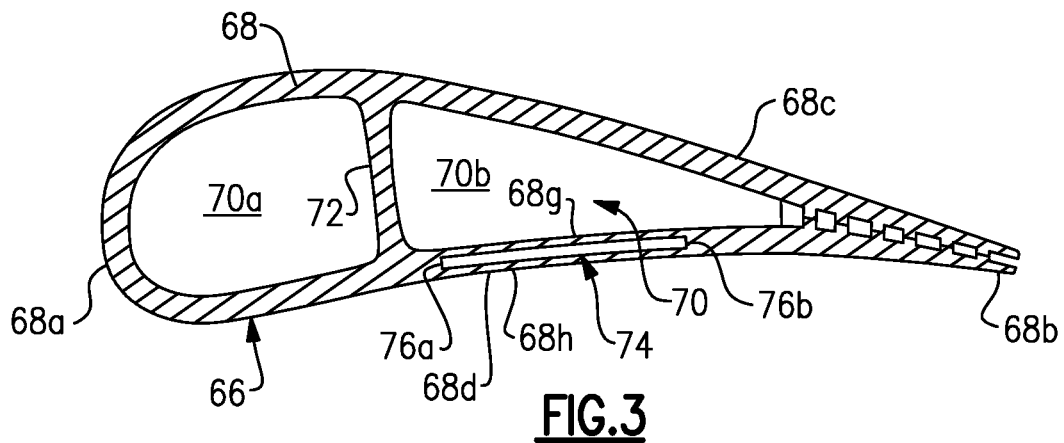
FIG. 3 illustrates a sectioned view of the airfoil of FIG. 2.
Figure 4:
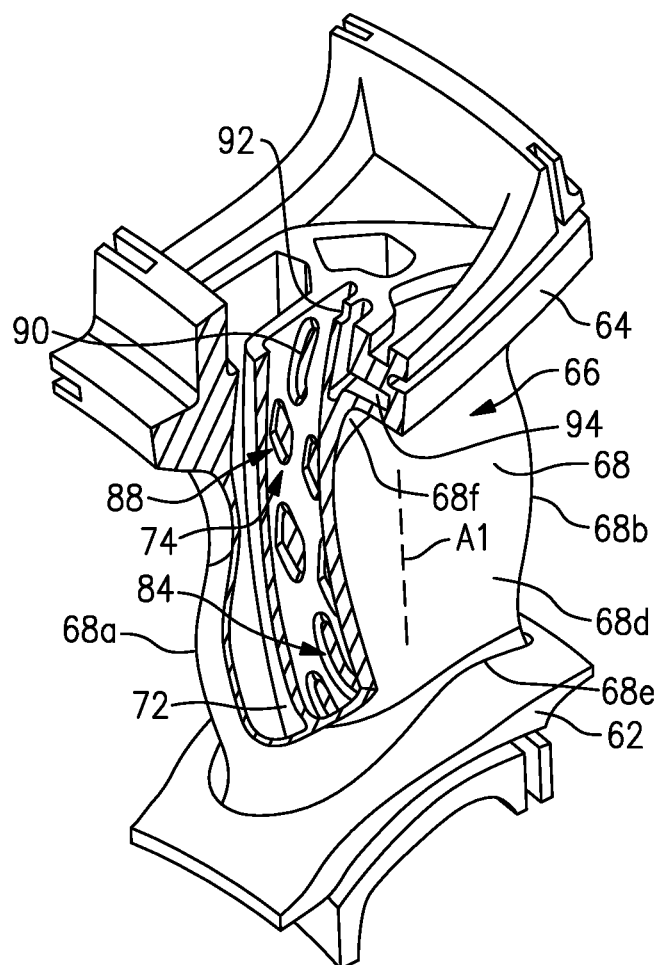
FIG. 4 illustrates a partial cutaway view of the airfoil of FIG. 2.

FIG. 2 illustrates a representative example of a turbine airfoil 60 used in the turbine engine 20 (see also FIG. 1), FIG. 3 shows a sectioned view of the airfoil 60, and FIG. 4 shows a partial cutaway view of the airfoil 60. As shown, the turbine airfoil 60 is a turbine vane.

The turbine airfoil 60 includes an inner or first platform 62, an outer or second platform 64, and an airfoil section 66 that radially spans between the inner and outer platforms 62/64. Terms such as "radially," "axially," or variations thereof are used herein to designate directionality with respect to the engine central axis A.

The airfoil section 66 includes an airfoil outer wall 68 that delimits the profile of the airfoil section 66. The outer wall 68 defines a leading end 68a, a trailing end 68b, and first and second sides 68c/68d that join the leading and trailing ends 68a/68b. The first and second sides 68c/68d span in a longitudinal direction, denoted by axis A1 (which is also a radial direction relative to the engine central axis A), between first and second ends 68e/68f. The first and second ends 68e/68f are attached, respectively, to the first and second platforms 62/64. In this example, the first side 68c is a suction side and the second side 68d is a pressure side.

The outer wall 68 of the airfoil section 66 circumscribes an internal core cavity 70. The airfoil section 66 further includes a rib 72 in the internal core cavity 70. The rib 72 partitions the internal core cavity 70, dividing the cavity 70 into a forward cavity 70a and an aft cavity 70b. In this example, the rib 72 extends from the first side 68c to the second side 68d and is solid and free of any orifices. The rib 72 thereby fluidly isolates the forward and aft cavities 70a/70b of the internal core cavity 70.

There is at least one cooling passage network 74 embedded in the airfoil outer wall 68 between inner and outer portions 68g/68h of the airfoil wall 68. For example, the cooling passage network 74 is embedded in the second side 68d of the outer wall 68, although one or more networks 74 could additionally or alternatively be embedded in the first side 68c. The cooling passage network 74 may also be referred to as a skin core or skin core passage. A "skin core" or "skin core passage" is a reference to the thin investment casting core or cores that is/are typically used to make such embedded passages, as opposed to a main core that is used to form a main or central core cavity in an airfoil.

Skin cores may generally include multiple elongated ribs that define longitudinal (radial) flow passages along the entire length of the skin core. The ribs may be aligned and thus bear the radial pull load present in blades. The ribs, however, add physical and thermal mass that is unnecessary but for the need to carry the pull load. In contrast, turbine vanes typically experience higher temperatures than blades. Such added thermal mass from ribs may therefore be undesirable. A vane does not experience the same radial loading as a blade and the structural concerns of a vane are more typically related to bulge and thermal mechanical fatigue. These loadings can be addressed, as in the examples below, by the introduction of smaller strategically placed and shaped flow guides, pedestals, and ribs that facilitate the reduction in thermal mass while still providing good heat transfer.

Figure 5:
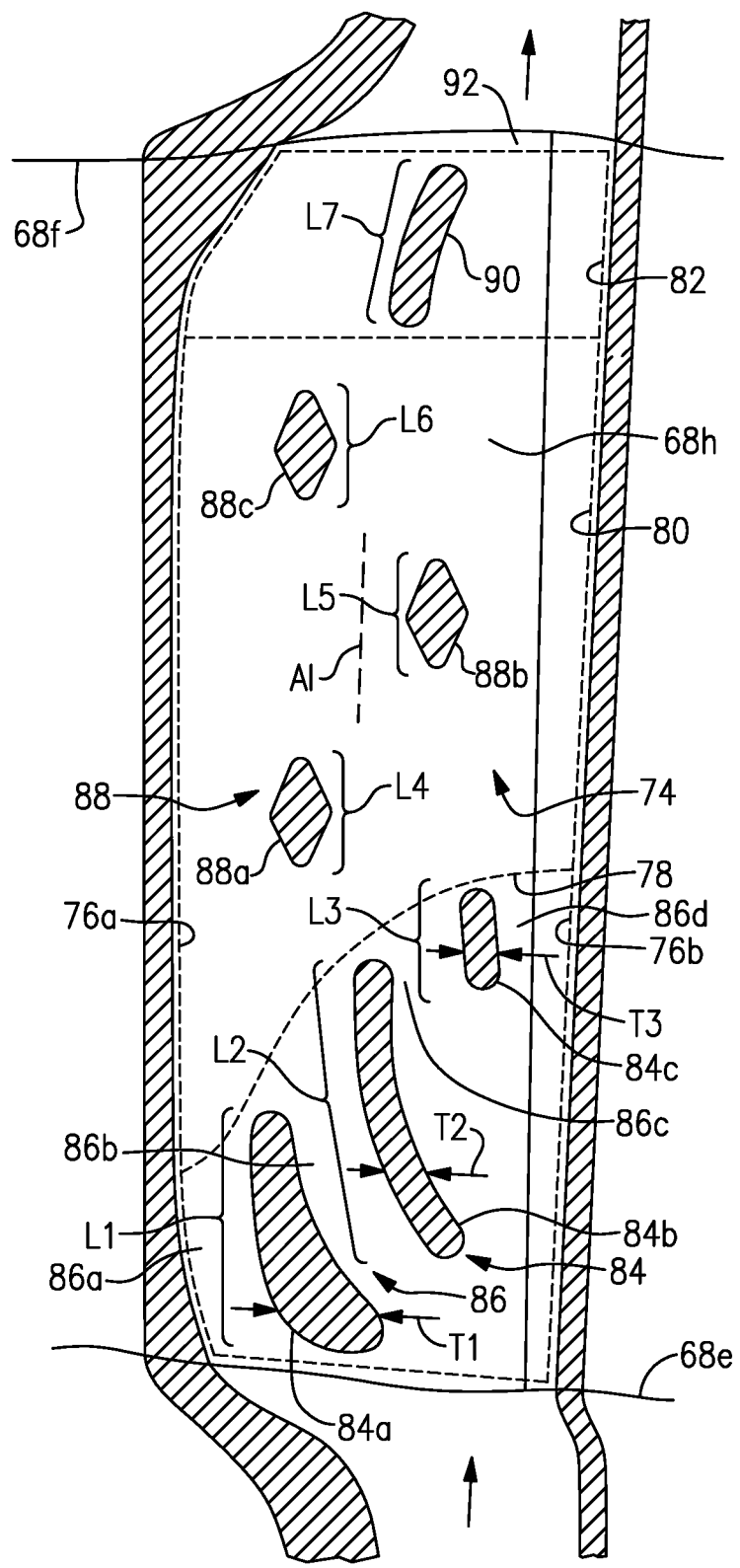
FIG. 5 illustrates a section view of a cooling network passage of the airfoil of FIG. 3.

FIG. 5 illustrates a sectioned view of selected portions of the network 74 to demonstrate an example configuration of the network 74. The network 74 defines a thin cavity that is bound axially by a leading cavity edge 76a and a trailing cavity edge 76b and laterally by the inner and outer wall portions 68g/68h (FIG. 3). In the illustrated example, the leading cavity edge 76a and the trailing cavity edge may be substantially parallel. The radially inner and outer ends of the network 74 may be open or include orifices or the like for conveying cooling air. For example, the network 74 opens into or is fluidly connected with cavities or plenums in the first and second platforms 62/64 that serve to deliver cooling air to, and receive cooling air from, the network 74.

The network 74 includes an entrance region 78 adjacent the first end 68e of the airfoil section 66, a plenum region 80 between the entrance region 78 and the second end 68f of the airfoil section 66, and an exit region 82 adjacent the plenum region 80. In some cases, the features on the airfoil platforms may determine the inlet and/or exit to the entrance region 78 and/or exit region 82 to be biased to either side of the skincore axis A1. In this illustrated example, the inlet and exit are biased to the right of the network axis A1 as shown in FIG. 5.

As such, the flow encounters an abrupt turn through the entrance region 78 and/or exit region 82. As such, there may occur flow separation from the walls 76a or 76b of the flow network which results in undesirable flow non-fill characteristics such as increased pressure losses and reduced heat pickup capability as the flow goes through the entrance and/or exit region of the flow network.

The entrance region 78 includes a plurality of flow guides 84 to alleviate such undesirable flow characteristics as the flow passes through the entrance and/or exit region of the skincore. In the illustrated example, the network 74 has three flow guides 84, which are individually designated 84a/84b/84c. The flow guides 84 divide the entrance region 78 into a plurality of channels 86. These flow guides have gentle turning profile to orient the flow to the flow-network axis A1. This gentle turning profile prevents sudden flow expansion that may result in flow separation pressure losses and non-fill characteristics at the entrance region. In this example, the three flow guides 84 divide the entrance region 78 into four channels, which are individually designated 86a/86b/86c/86d. The channels 86 open into the plenum region 80. The plenum region 80 thus begins at the outlets of the channels 86a/86b/86c/86d, i.e., the ends of the flow guides 84a/84b/84c.

The plenum region 80 is a substantially open region but includes a plurality of pedestals 88, individually designated 88a/88b/88c. In this example, the pedestals 88a/88b/88c are diamond-shaped and are staggered such that none of the pedestals 88a/88b/88c overlap in a direction perpendicular to the longitudinal direction A1. In some cases, the pedestals may be airfoil shaped or race-track to provide flow redistribution across the flow network 74. These pedestal features also serve to provide structural support for the skincore wall from bulging and/or creep behavior as a result of pressure differential between skincore flow and the external airfoil.

The exit region 82 includes a single rib 90 that is elongated in the longitudinal direction A1. The plenum region 80 extends longitudinally up to the end of the rib 90. In the example shown, the rib 90 is oriented at an oblique angle to the longitudinal direction A1, to divert the cooling air toward an outlet orifice 92.

The flow guides 84 are generally grouped such that at least two of the flow guides 84 overlap in a direction perpendicular to the longitudinal direction A1. As an example, flow guides 84a and 84b overlap, and flow guides 84b and 84c overlap. The overlapping grouping provides continuity in the flow through the entrance region 78.

Each of the flow guides 84 has a distinct shape among all of the flow guides 84. As an example, the flow guides 84 vary in length in the longitudinal direction A1, vary in thickness in a direction perpendicular to the longitudinal direction A1, or both. As an example, the flow guides 84 define flow guide lengths L1, L2, and L3, respectively, in the longitudinal direction A1, and the flow guide lengths L1, L2, and L3 all differ from each other. In one further example, at least one of the lengths L1, L2, or L3 is greater than another of the lengths L1, L2, or L3 by a factor of at least 2, at least 2.5, or at least 3. In one additional example, no one of the lengths L1, L2, or L3 is greater than another of the lengths L1, L2, or L3 by a factor of more than 8, or preferably by a factor of no more than 5.

In additional examples, the flow guides 84 also define flow guide thicknesses T1, T2, and T3 in a direction perpendicular to the longitudinal direction A1, and the flow guide thicknesses T1, T2, and T3 differ from each other. The thicknesses T1, T2, and T3 are the maximum thickness of the respective flow guides 84a/84b/84c. In one example, at least one of the thicknesses T1, T2, and T3 is greater than another of the thicknesses T1, T2, and T3 by a factor of at least 2, at least 2.5, or at least 3. In one additional example, no one of the thicknesses T1, T2, and T3 is greater than another of the thicknesses T1, T2, and T3 by a factor of more than 8, or preferably no more than 4.

In additional examples, the flow guides 84 also have different shapes with regard to being arced or straight. For instance, at least one of the flow guides 84 is arced and at least one of the flow guides 84 is straight. In the illustrated example, flow guides 84a/84b are arced and flow guide 84c is straight. The arced shape of the flow guides 84a/84b facilitate turning the incoming cooling air, which mainly flow in from the bottom right-hand region in FIG. 5 in the illustrated example in FIG. 5.

In the plenum region 80, the pedestals 88 define pedestal lengths L4, L5, and L6 in the longitudinal direction A. As an example, the pedestal lengths L1, L2, and L3 are less than at least one of the flow guide lengths L1, L2, or L3. For instance, all of the pedestal lengths L4, L5, and L6 are less than at least two of the flow guide lengths L1, L2, or L3. In the illustrated example, the pedestal lengths L4, L5, and L6 are each less than at least the flow guide lengths L1 and L2.

In the exit region 82, the rib 90 also defines a rib length L7 in the longitudinal direction. As an example, the rib length L7 is greater than each of the pedestal lengths L4, L5, and L6.

In the examples herein, the flow guides 84, pedestals 88, and rib 90 facilitate thermal transfer and also reduce thermal mass. For instance, cooling air enters the network 74 into the entrance region 78, where the flow guides 84 divide and distribute the cooling air into the channels 86. The channels 86 distribute the cooling air into the plenum region 80. The pedestals 88 in the plenum region are relatively small and the cooling air splits and rejoins around the pedestals 88, without inducing recirculation zones. The pedestals 88 provide sufficient structure to withstand bulging of the wall portion 68h from heat and pressure, while also providing increased surface area for heat transfer and convective cooling. In the exit region 82, the rib 90 divides the cooling air received from the plenum region 80. The rib guides the cooling air toward the outlet orifice 92 (see also FIG. 4). The outlet orifice 92 opens to a plenum 94 in the second platform 64, from which the cooling air is released into the core gas path. The configuration of the network 74 thereby facilitates even distribution of the cooling air (along the wall portion 68h) while reducing mass from the elimination of multiple full-length ribs.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity; and
a cooling passage network embedded in the airfoil wall between inner and outer portions of the airfoil wall, the cooling passage network having an entrance region adjacent the first end of the airfoil section, a plenum region between the entrance region and the second end of the airfoil section, and an exit region adjacent the plenum region, the entrance region including a plurality of flow guides dividing the entrance region into a plurality of channels opening into the plenum region, each of the flow guides having a distinct shape among the plurality of flow guides, the flow guides defining flow guide lengths in the longitudinal direction and the flow guide lengths differ from each other, and the plenum region including a plurality of pedestals having a shape different from the flow guides.

2. The airfoil as recited in claim 1, wherein the flow guides define flow guide thicknesses in a direction perpendicular to the longitudinal direction, and the flow guide thicknesses differ from each other.

3. The airfoil as recited in claim 1, wherein at least one of the flow guides is arced.

4. The airfoil as recited in claim 1, wherein the plurality of flow guides consists of three flow guides dividing the entrance region into four of the channels.

5. The airfoil as recited in claim 1, wherein at least two of the flow guides overlap in a direction perpendicular to the longitudinal direction.

6. The airfoil as recited in claim 1, wherein the pedestals define pedestal lengths in the longitudinal direction, the flow guides define flow guide lengths in the longitudinal direction, and the pedestal lengths are less than at least one of the flow guide lengths.

7. The airfoil as recited in claim 6, wherein the exit region includes a rib that is elongated in the longitudinal direction.

8. The airfoil as recited in claim 7, wherein the rib defines a rib length in the longitudinal direction, and the rib length is greater than each of the pedestal lengths.

9. The airfoil as recited in claim 1, including first and second platforms attached, respectively, with the first and second ends, the second platform including a platform plenum, and the cooling passage network including an outlet orifice opening to the platform plenum.

10. The airfoil as recited in claim 1, wherein the cooling passage network defines a longitudinal axis, and the entrance region has an inlet that is biased to one side of the longitudinal axis.

11. A gas turbine engine comprising:
a compressor section;
a combustor in fluid communication with the compressor section; and
a turbine section in fluid communication with the combustor,
the turbine section having a turbine airfoil that includes
an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity, and
a cooling passage network embedded in the airfoil wall between inner and outer portions of the airfoil wall, the cooling passage network having an entrance region adjacent the first end of the airfoil section, a plenum region between the entrance region and the second end of the airfoil section, and an exit region adjacent the plenum region, the entrance region including a plurality of flow guides dividing the entrance region into a plurality of channels opening into the plenum region, each of the flow guides having a distinct shape among the plurality of flow guides, the flow guides defining flow guide lengths in the longitudinal direction and the flow guide lengths differ from each other, and the plenum region including a plurality of pedestals having a shape different from the flow guides.

12. The gas turbine engine as recited in claim 11, wherein the flow guides define flow guide thicknesses in a direction perpendicular to the longitudinal direction, and the flow guide thicknesses differ from each other.

13. The gas turbine engine as recited in claim 11, wherein at least one of the flow guides is arced.

14. The gas turbine engine as recited in claim 13, wherein at least one of the flow guides is straight.

15. The gas turbine engine as recited in claim 11, wherein the plurality of flow guides consists of three flow guides dividing the entrance region into four of the channels.

16. The gas turbine engine as recited in claim 11, wherein at least two of the flow guide overlap in a direction perpendicular to the longitudinal direction.

17. The gas turbine engine as recited in claim 11, wherein the pedestals defines pedestal lengths in the longitudinal direction, the glow guides define flow guide lengths in the longitudinal direction, and the pedestal lengths are less than at least one of the flow guide lengths.

18. The gas turbine engine as recited in claim 17, wherein the exit region includes a rib that is elongated in the longitudinal direction, the rib defines a rib length in the longitudinal direction, and the rib length is greater than each of the pedestal lengths.

19. An airfoil comprising:
an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity;

first and second platforms having, respectively, first and second platform plenums; and a cooling passage network embedded in the airfoil wall between inner and outer portions of the airfoil wall, the cooling passage network having an entrance region including an inlet that opens to the first platform plenum and receives cooling air there from, a plenum region between the entrance region and the second end of the airfoil section, and an exit region including an outlet that opens to the second platform plenum to discharge the cooling air thereto, the entrance region including a plurality of flow guides dividing the entrance region into a plurality of channels opening into the plenum region, and the plenum region including a plurality of pedestals having a shape different from the flow guides.

20. The airfoil as recited in claim 19, wherein the cooling passage network defines a longitudinal axis, and the inlet is biased to one side of the longitudinal axis.

* * * * *